United States Patent

Packel

[15] 3,705,425
[45] Dec. 5, 1972

[54] STRIP CHART RECORDER
[72] Inventor: Morton A. Packel, Philadelphia, Pa.
[73] Assignee: Moore Products Co., Spring House, Pa.
[22] Filed: Oct. 23, 1970
[21] Appl. No.: 83,385

[52] U.S. Cl. .................. 346/72, 346/139 R, 346/136
[51] Int. Cl. ............................................... G01d 5/06
[58] Field of Search ............ 346/72, 136, 139 R, 145; 318/166

[56] References Cited

UNITED STATES PATENTS

| 2,852,197 | 9/1958 | Virbila | 346/72 X |
| 2,594,136 | 4/1952 | DiMaggio | 346/139 X |
| 2,913,299 | 11/1959 | Clift | 346/136 X |
| 3,209,363 | 9/1965 | Virbila | 346/72 X |
| 3,306,548 | 2/1967 | Polder | 346/136 UX |

Primary Examiner—Joseph W. Hartary
Attorney—Zachary T. Wobensmith

[57] ABSTRACT

A strip chart recorder of the pneumatic type is disclosed which has a removably mounted chart magazine assembly and drive therefor with a chart rewinding mechanism which maintains the chart in tension. Amplification of the analog pressure signals is provided by a servo operating a bell crank. The pens and associated indicating pointers are gravity urged toward their zero positions.

1 Claim, 8 Drawing Figures

INVENTOR
MORTON A. PACKEL
BY
B.T. Wobensmith
ATTORNEY

INVENTOR
MORTON A. PACKEL
BY
　　Z. T. Wolfensmith
ATTORNEY

INVENTOR
MORTON A. PACKEL
BY
ATTORNEY

INVENTOR
MORTON A. PACKEL
ATTORNEY

STRIP CHART RECORDER

BACKGROUND OF THE INVENTION

1. Field of the Invention

This invention relates to a strip chart recorder of the pneumatic type which is operated by signals from one or more pneumatic transmitter or transducer type instruments.

2. Description of the Prior Art

Strip chart recorders of the pneumatic type for recording signals from chemical and other processes have been in use for many years but various difficulties have been encountered in operation due to a multitude of causes, including lack of sensitivity, loss of sensitivity after continuous use, difficulty in removing and replacing the strip chart, excessive air consumption, pen failure, and other defects.

SUMMARY OF THE INVENTION

In accordance with this invention, a strip chart recorder is provided which has an improved chart magazine assembly and drive therefor with continuously available rewind or takeup, the chart magazine assembly being readily movable into position for recording, movable to a position for chart replacement and removable from the recorder chassis, with pneumatic amplification of the analog pressure signal and application of the amplified signal to the chart by a bell crank for mechanical amplification and change of direction, the recorder being readily adapted for use in new and in existing installations.

It is the principal object of the present invention to provide an improved strip chart recorder which will be free from the shortcomings of strip chart recorders heretofore available.

It is a further object of the present invention to provide a strip chart recorder having an improved drive and rewind mechanism for determining the chart movement.

It is a further object of the present invention to provide a strip chart recorder having an improved recording pen actuating mechanism which includes a bell crank operator with gravity return of the pen arm.

It is a further object of the present invention to provide a strip chart recorder in which recording is effected on a chart having rectilinear time lines.

It is a further object of the present invention to provide a strip chart recorder having high calibration accuracy, a high order of repeatability, excellent resolution, low hysteresis, low air consumption, and low supply pressure effect.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings, the strip chart recorder in accordance with the present invention preferably includes a base plate 10 on which a plurality of actuator assemblies such as the actuator assemblies 11a, 11b and 11c, are mounted.

Each of the actuator assemblies includes a body portion 14 which is secured to the base plate 10 by screws (not shown).

Figure 8:
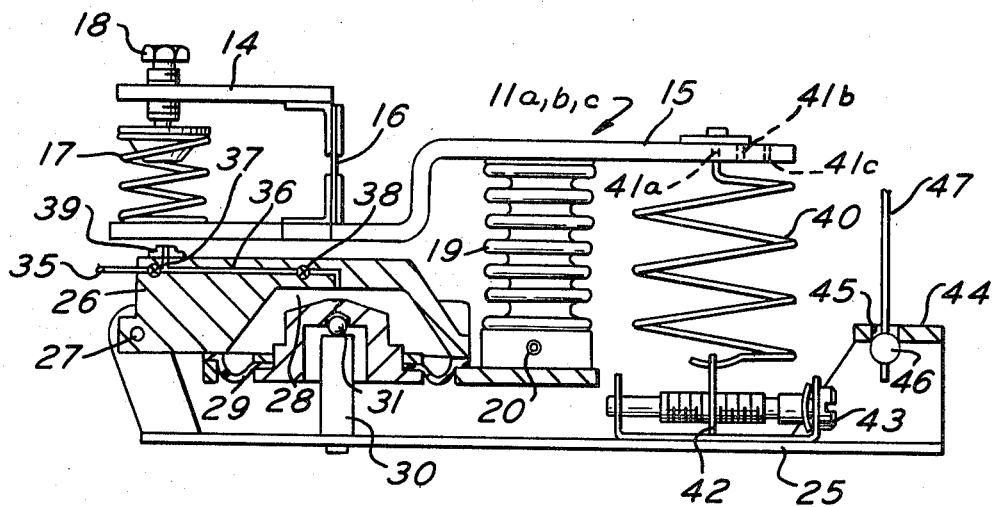
FIG. 8 is a diagrammatic view of a portion of the actuator system.

Each of the actuator assemblies (see FIG. 8) includes a force beam 15 secured to the body portion 14 by a hinge plate 16 and with a zero adjusting spring 17 between the body portion 14 and the beam 15. An adjusting screw 18 is provided to adjust the zero spring 17.

An input bellows 19 is provided between the body portion 14 and the force beam 15 to which the input signal is supplied through a signal input connection 20.

A motion lever 25 is provided pivotally carried on an actuator housing 26 by a pivot pin 27. The housing 26 is preferably integral with the body portion 14 and has an actuator chamber 28 therein which is bounded in part by a diaphragm 29 and is connected in operating relation to the motion lever 25 by a rod 30. The rod 30 bears on a ball 31 secured to the center a diaphragm 29 at a point interior of the chamber 28 with respect to the flexible portion of the diaphragm 29 to provide mechanical stability without guides.

A supply connection 35 is provided to a source of fluid under pressure, and preferably pressure regulated and filtered air. The supply connection 35 is connected to a fluid passageway 36 extending to diaphragm chamber 28 and having a supply restriction 37 therein and a damping restriction 38 therein. A nozzle 39 connected to the fluid passageway 36 between the restrictions 37 and 38 is controlled by the positioning of the force beam 15 with respect thereto.

A feed back spring 40 has one end engaged with the force beam 15 at a selected location 41a, b, c, and to a travelling link 42 carried on a vernier span adjustment screw 43 on the motion lever 25.

The motion lever 25 has an end plate portion 44 with an opening 45 for engagement by a ball 46 on a drag link 47.

The drag links 47 for the respective actuator assemblies 11a, 11b and 11c are of different lengths, and are each pivotally connected by pivot pins 50 to their respective bell cranks 51. The bell cranks 51 are separately pivotally mounted in a pin arm bracket 54 by pivot pins 52 and have pin arms 55 slidably engaging pen assemblies 56 with circular discs 57. The respective lengths of the arms of the bell cranks 51 determine the mechanical amplification effected.

The pen assemblies 56 are guided in their vertical movement, as urged upwardly by the pen arms 55 and downwardly by gravity, by guides 53 which are slidable on vertical guide rods 58 of circular cross section which serve as ways. The guide rods 58 are detachably engaged at their lower ends in the base plate 10 and at their upper ends are detachably carried by a frame 59 mounted on the base plate 10.

Flexure springs 60 are connected to the assembly 56 and bear against the pen arms 55.

Each pen assembly 56 includes an ink cartridge 61 with ink therein of the desired color and an ink tube 62 and pen or stylus 63. The pens 63 are preferably of fibrous material.

The frame 59 has value scales 64 carried thereon and the ink tubes 62 have pointer fingers 65 mounted thereon for cooperation with the scales 64.

A detachable chart assembly and driving mechanism therefor is also provided. For this purpose, a chart drive motor 66 is mounted on a motor supporting bracket 67 on the base plate 10. The drive motor 66 can be of any desired type but in one embodiment is a 110 volt AC 60 Hz motor to drive the chart C at a standard chart speed of seven-eighths of an inch per hour.

The drive motor 66 has a built in overrunning clutch (not shown) to permit manual chart adjustment in the forward direction and has an output shaft 68 carrying a gear 70.

A chart magazine 72 is provided which includes a chart frame 74 which is detachably and pivotally carried on the base plate 10 with a notch 75 engaging a headed pivot pin 76. The chart frame 74 has a chart driving drum 77 pivotally mounted thereon with a gear 78 at its lower end for normal engagement by the gear 70, but capable of being disengaged upon swinging of the chart frame 74 about the pivot pin 76 to a position for disengagement at the notch 75. A hand wheel 73 is provided for manual rotation of the drum 77, if desired and chart drive pins 79 can be provided on the drum 77.

The chart frame 74 also has a vertical chart supply spindle 80 thereon onto which a roll of strip chart C is supplied, a vertical chart guide rod 81, a vertical chart back up bar 82, a vertical chart back up plate 83, and a bushing and guide post 84.

A lower spool guide 85 is pivotally mounted on the frame 74 with freedom to nutate.

At the upper end of the post 84 an upper spool guide 87 is provided with freedom to nutate and rotate on a pivot carried on a pivotally mounted locating plate 88. The spool guides 85 and 87 carry a chart collecting spool 89, keyed to a gear 86 for rotation therewith.

A rewind or chart take up motor 90 is mounted on a bracket 91 on the base plate 10. The motor 90 can be of any desired type but in one specific embodiment of the invention is a hysteresis synchronous motor suitable for continuous duty when stalled and can be a 110 volt 60 AC Hz motor with a shaft speed of 100 rpm.

The motor 90 has a motor shaft 94 with a gear 95 secured thereto for normal continuous engagement with the gear 86 but disengageable upon removal of the chart frame 74.

A spring urged latch finger 96 on the chart frame 74 normally engages a latch pin 97 on the base plate 10 and releasably retains the chart magazine in operating position. Release of the latch finger 96 permits swinging of the chart frame 74 about pivot pin 76 as an axis and sliding movement at the notch 75 to disengage the chart frame 74 from the pin 76.

A mounting plate 98 supported on posts 99 above the base plate 10, has a pneumatic connection block 100 mounted thereon, with fluid connections to the supply, and to the input signals, and to the actuator assemblies 11a, 11b, and 11c.

The mode of operation will now be pointed out.

Air under pressure is supplied from the supply connection to each of the actuator assemblies. The air is delivered into the fluid connection 36 through the restriction 37 and through the restriction 38 to the diaphragm chamber 28 where it is effective against the diaphragm chamber 28 where it is effective against the diaphragm 29 for applying a force through the rod 30 against the motion lever 25. The pressure in the fluid connection 36 and in the chamber 28 is determined by the positioning of the force beam 15 with respect to the nozzle 39 to control the escape of air therethrough.

The force beam 15 is positioned by the pressure applied in the bellows 19 through the input connection 20. Adjustment of the spring 17 determines the zero position of the beam 15 and the feedback spring 40 by its connection to the motion lever 25 is effective for rebalancing the force beam 15 to its initial position prior to any change effective thereon.

The positioning of the motion lever 25 positions the drag link 47 and this link 47 through the bell crank 51 moves the bell crank pen arm 55. The pen assembly 56 is positioned by the disc 57 in engagement therewith to raise or lower the pen arm 55 in accordance with the input signal in the bellows 19.

The pen arm 55 moves the pen assembly 56 vertically on the appropriate guide rod 58 to position the ink tube 62 and the pen 63 carried thereby on the chart C. At the same time the pointer finger 65 carried by the tube 62 is positioned with respect to its value scale 64.

It will be noted that positive forces are applied to raise the pen assemblies 56 but that these are lowered by the action of gravity.

The pens 63 are effective on the chart C to record, with amplification, the signals in the respective input bellows 19.

The chart C carried in the chart magazine 72 is advanced from the roll on the supply spindle 80 by the engagement of the chart drive pins 79 on the drum 77.

The chart drive motor 66 through the motor shaft 68 and gears 70 and 78 rotates the drum 77 for chart advance.

The motor 90 is effective through the shaft 94 and gear 95 which is engaged with the gear 86 to apply a torque continuously on spool 89 to maintain the chart C previously attached to the spool 89 under tension.

Figure 1:
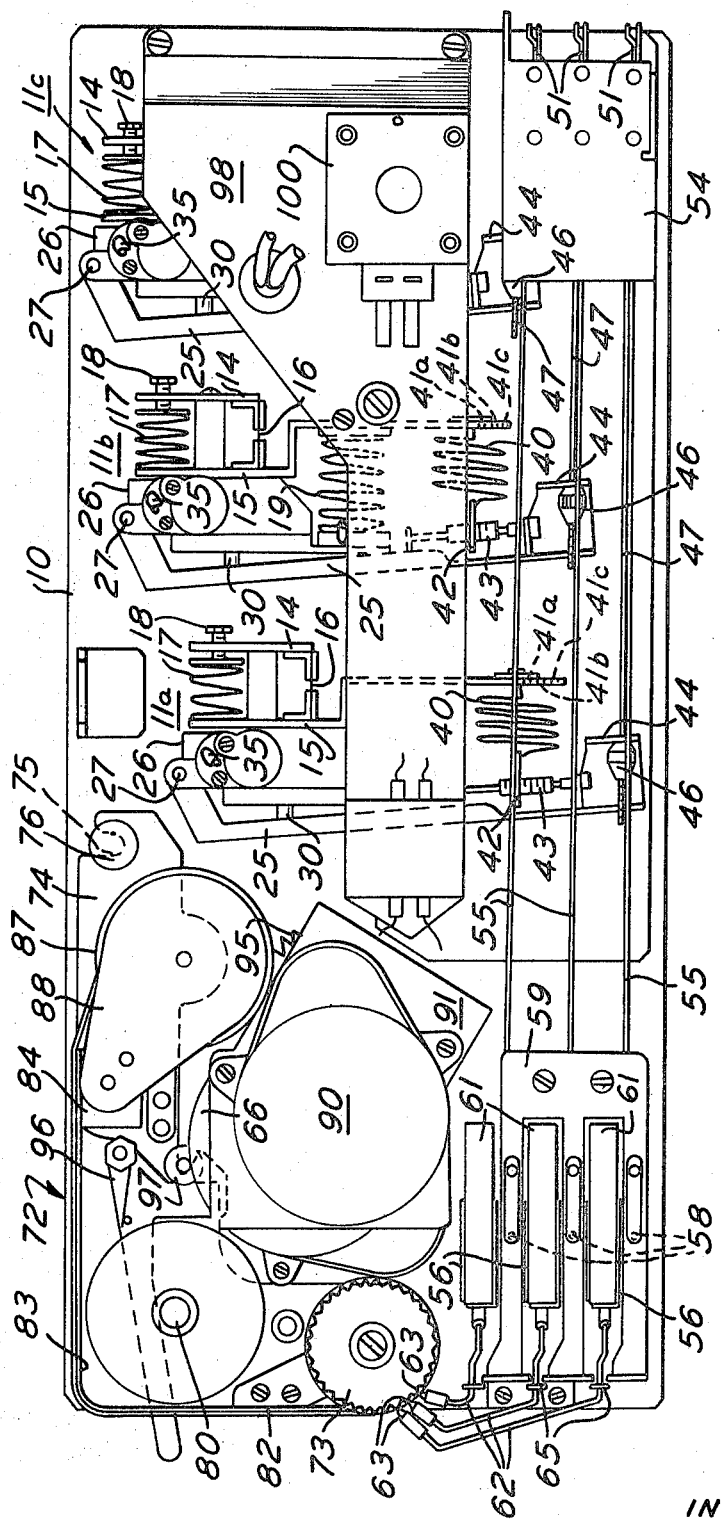
FIG. 1 is a top plan view of a strip chart recorder in accordance with the invention.
Figure 2:
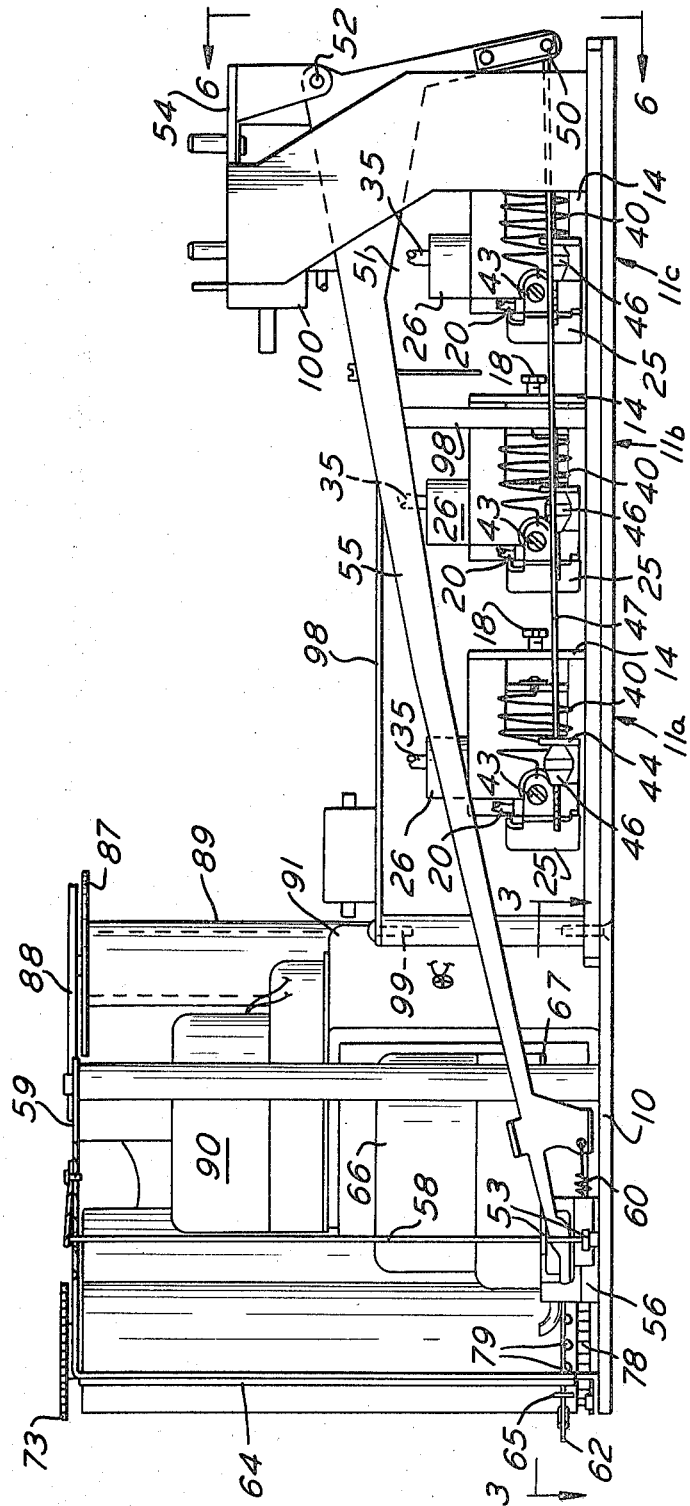
FIG. 2 is a side elevational view of the recorder, shown in FIG. 1.
Figure 3:
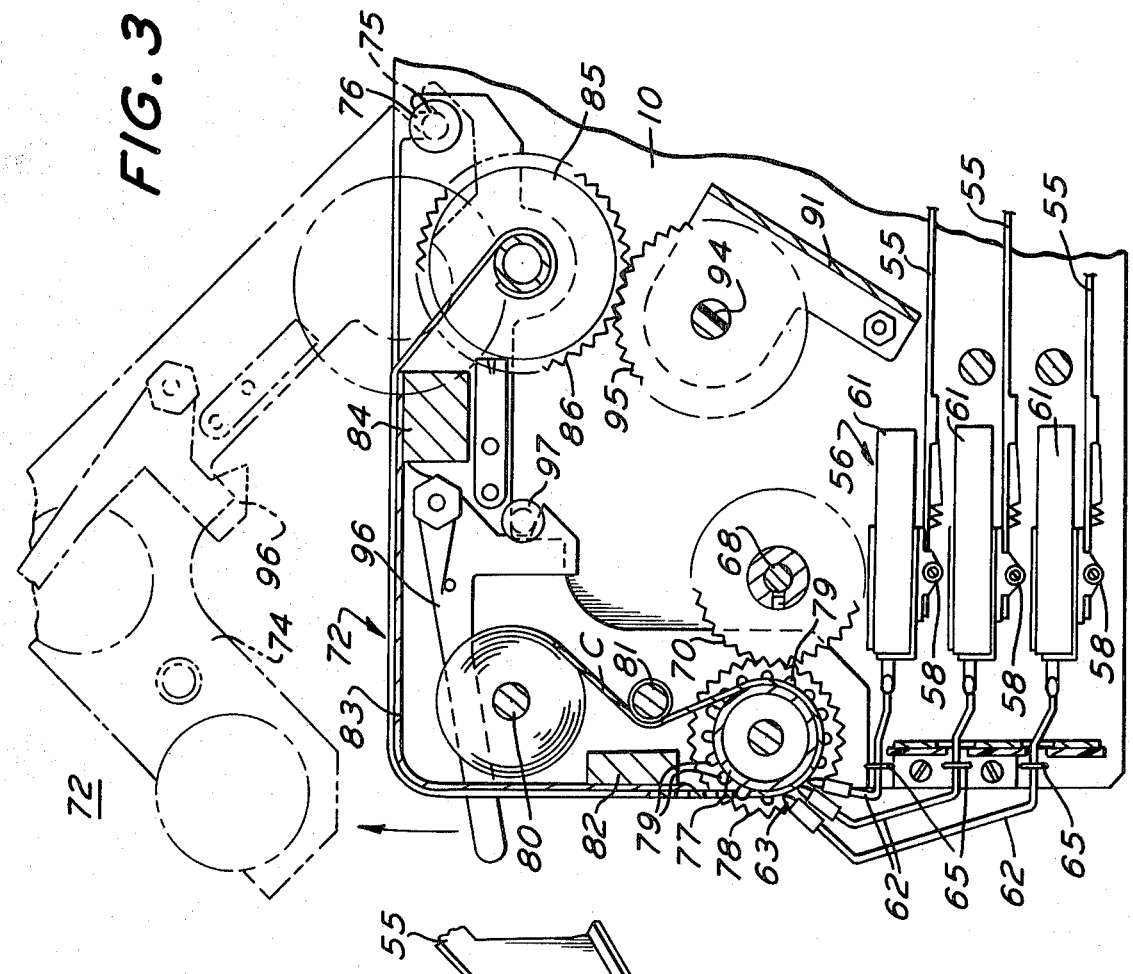
FIG. 3 is a fragmentary horizontal sectional view, enlarged taken approximately on the line 3—3 of FIG. 2.
Figure 4:
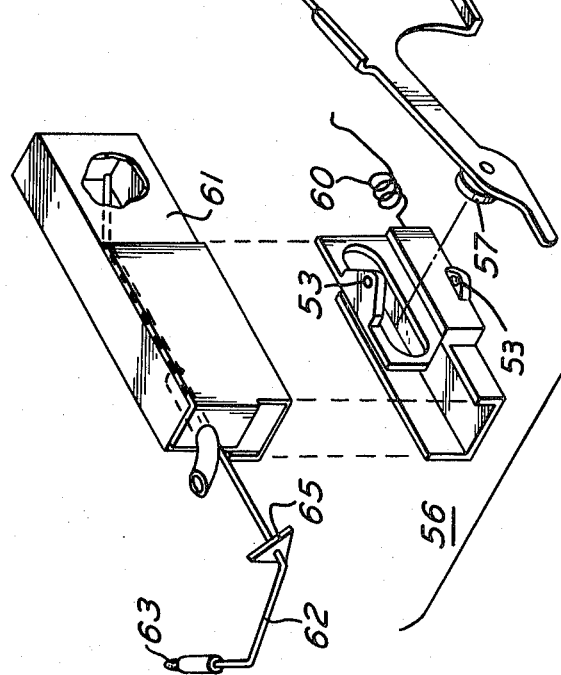
FIG. 4 is an exploded perspective view of the pen and ink cartridge and the pen arm connection.
Figure 5:
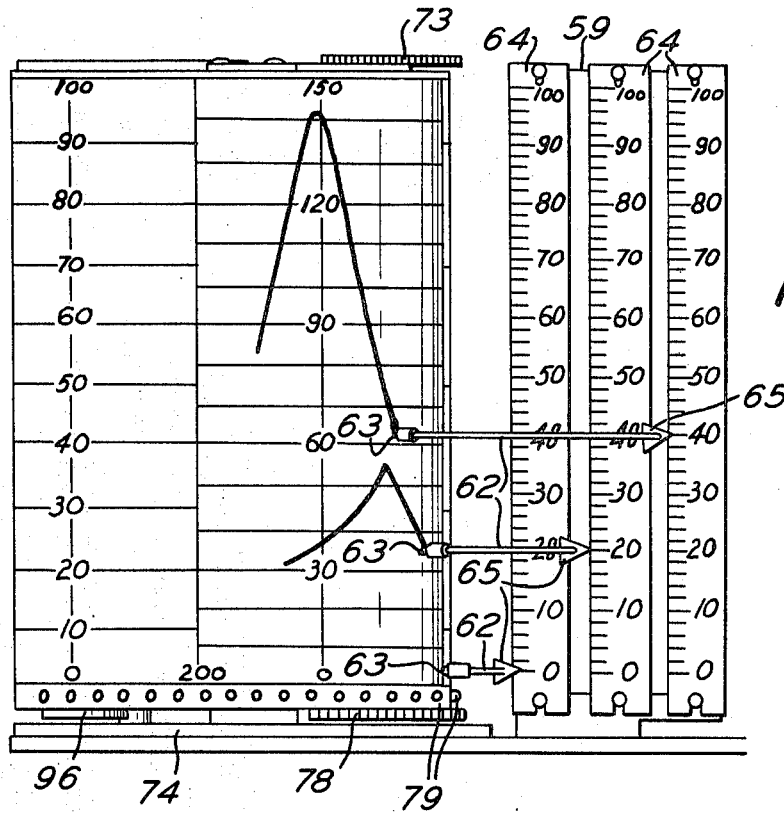
FIG. 5 is a front elevational view showing the chart, the pens and the indicator scales.
Figure 6:
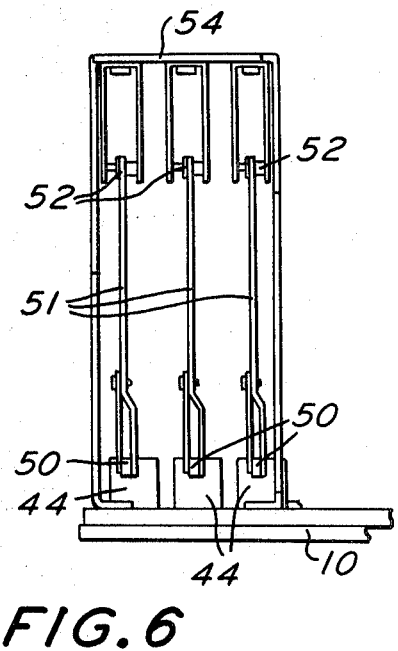
FIG. 6 is an end view as seen from the line 6—6 of FIG. 2.
Figure 7:
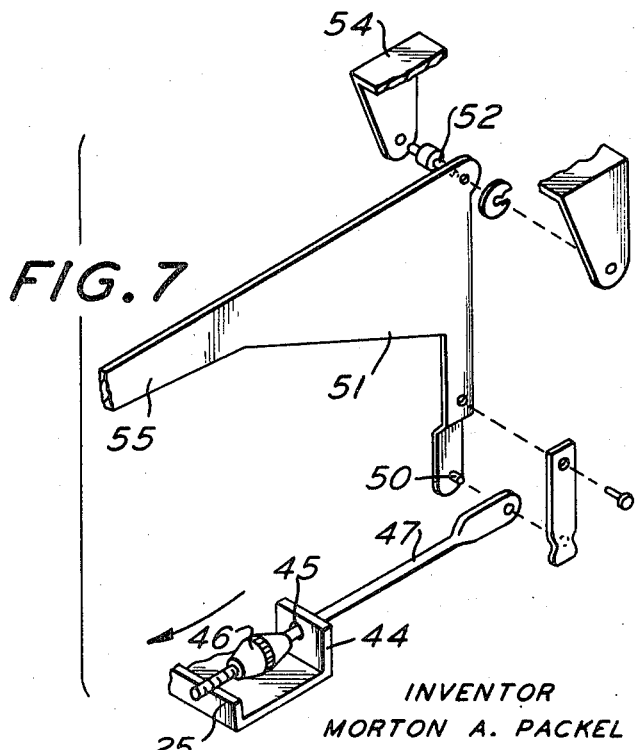
FIG. 7 is an exploded perspective view of the bell crank drive.

The chart magazine 72 can be removed by releasing the latch finger 96 from engagement with the pin 97 and swinging the magazine 72 to the position shown in broken lines in FIG. 3. The chart C may then be shifted by turning the hand wheel 73 to turn the drum 77 in either direction.

The magazine 72 can then, if desired, be completely removed by sliding at the notch 75 to disengage the pin 76.

Access to the spool 89 is available by raising the locating plate 88 to a position to clear the spool 89 and swinging it to a position for removal of a filled spool 89 and replacement by an empty spool 89 to which a new chart C is attached.

Although a three pen recorder has been described one or more of the pens could be omitted while retaining the pointer fingers 65, if desired.

It will thus be seen that a recorder has been provided with which the objects of the invention are attained.

I claim:

1. A strip chart recorder for recording a condition representing an analog pressure comprising recording means, analog pressure sensing means, valve means controlled by said sensing means and supplying controlled fluid pressure from a source, motor means controlled by said valve means comprising a diaphragm chamber within which the pressure from said valve means is effective, a flexible diaphragm member bounding said diaphragm chamber, a pivotal take off connection inset within the diaphragm chamber with respect to said diaphragm member, and an output member connected to said take off connection and said recording means, and a resilient feed back connection between said output member and said valve means.

* * * * *